US011976617B2

(12) United States Patent
McKaughan

(10) Patent No.: US 11,976,617 B2
(45) Date of Patent: May 7, 2024

(54) INTERNAL COMBUSTION ENGINE AIR INTAKE SYSTEM

(71) Applicant: Jeffrey Andrew McKaughan, Upland, CA (US)

(72) Inventor: Jeffrey Andrew McKaughan, Upland, CA (US)

( * ) Notice: Subject to any disclaimer, the term of this patent is extended or adjusted under 35 U.S.C. 154(b) by 27 days.

(21) Appl. No.: 17/978,703

(22) Filed: Nov. 1, 2022

(65) Prior Publication Data

US 2023/0193862 A1 Jun. 22, 2023

Related U.S. Application Data

(63) Continuation of application No. 17/554,534, filed on Dec. 17, 2021, now Pat. No. 11,493,006.

(51) Int. Cl.
*F02M 35/10* (2006.01)
*F02M 35/02* (2006.01)

(52) U.S. Cl.
CPC .. *F02M 35/10118* (2013.01); *F02M 35/0212* (2013.01); *F02M 35/10255* (2013.01)

(58) Field of Classification Search
CPC ......... F02M 35/10118; F02M 35/0212; F02M 35/10255; F02M 35/10; F02M 35/10111; F02M 35/044; F02M 35/116
See application file for complete search history.

(56) References Cited

U.S. PATENT DOCUMENTS 7,069,895 B2 * 7/2006 Itoh ...................... F02M 35/167 123/184.31
2003/0140882 A1 * 7/2003 Lundgreen .............. F02B 61/02 123/184.31
2013/0140882 A1 * 6/2013 Agnew ................... B60L 50/30 307/9.1
2016/0377031 A1 * 12/2016 Pursifull ............ F02M 25/0836 60/602

* cited by examiner

*Primary Examiner* — Syed O Hasan
(74) *Attorney, Agent, or Firm* — Paul J. Backofen, Esq.

(57) ABSTRACT

An improved internal combustion engine air intake system that operates in tandem with the original equipment air intake system and does not endanger the vehicle warranty and provides improved airflow to the engine which improves engine performance and efficiency. The improved internal combustion engine air intake system also provides one or more additional air inputs taken from a different location than the original equipment air intake which improves the likelihood of providing additional cooler, denser, air to the engine air intake which will improve engine efficiency.

6 Claims, 6 Drawing Sheets

INTERNAL COMBUSTION ENGINE AIR INTAKE SYSTEM

RELATED APPLICATIONS

This application is a continuation of U.S. application Ser. No. 17/554,534, filed Dec. 17, 2021, now U.S. Pat. No. 11,493,006 (Nov. 8, 2022) which in turn claims priority to U.S. Provisional Application 63/271,061, filed Oct. 22, 2021.

FIELD OF THE INVENTIONS

The inventions described below relate to the field of air intake systems for internal combustion engines.

BACKGROUND OF THE INVENTIONS

Internal combustion engines requires sufficient airflow to completely combust the fuel in the engine. Conventional original equipment air intake systems are generally compromise systems that balance the volume of air they can conduct against the space in the engine compartment required for the air intake and air filter. If a vehicle owner modifies the original equipment air intake system to improve the airflow the modification may invalidate the vehicle owners warranty.

SUMMARY

The devices and methods described below provide for an improved internal combustion engine air intake system that operates in tandem with the original equipment air intake system and does not endanger the vehicle warranty and provides improved airflow to the engine which improves engine performance and efficiency.

Conventional engine air intakes are generally at or very near the top of the engine which, in enclosed engine compartments generally results in providing the hottest air to the engine air intake. The improved internal combustion engine air intake system provides one or more additional air inputs taken from other locations which improves the likelihood of providing cooler, denser, air to the engine air intake which will improve engine efficiency.

DETAILED DESCRIPTION OF THE INVENTIONS

Figure 1:
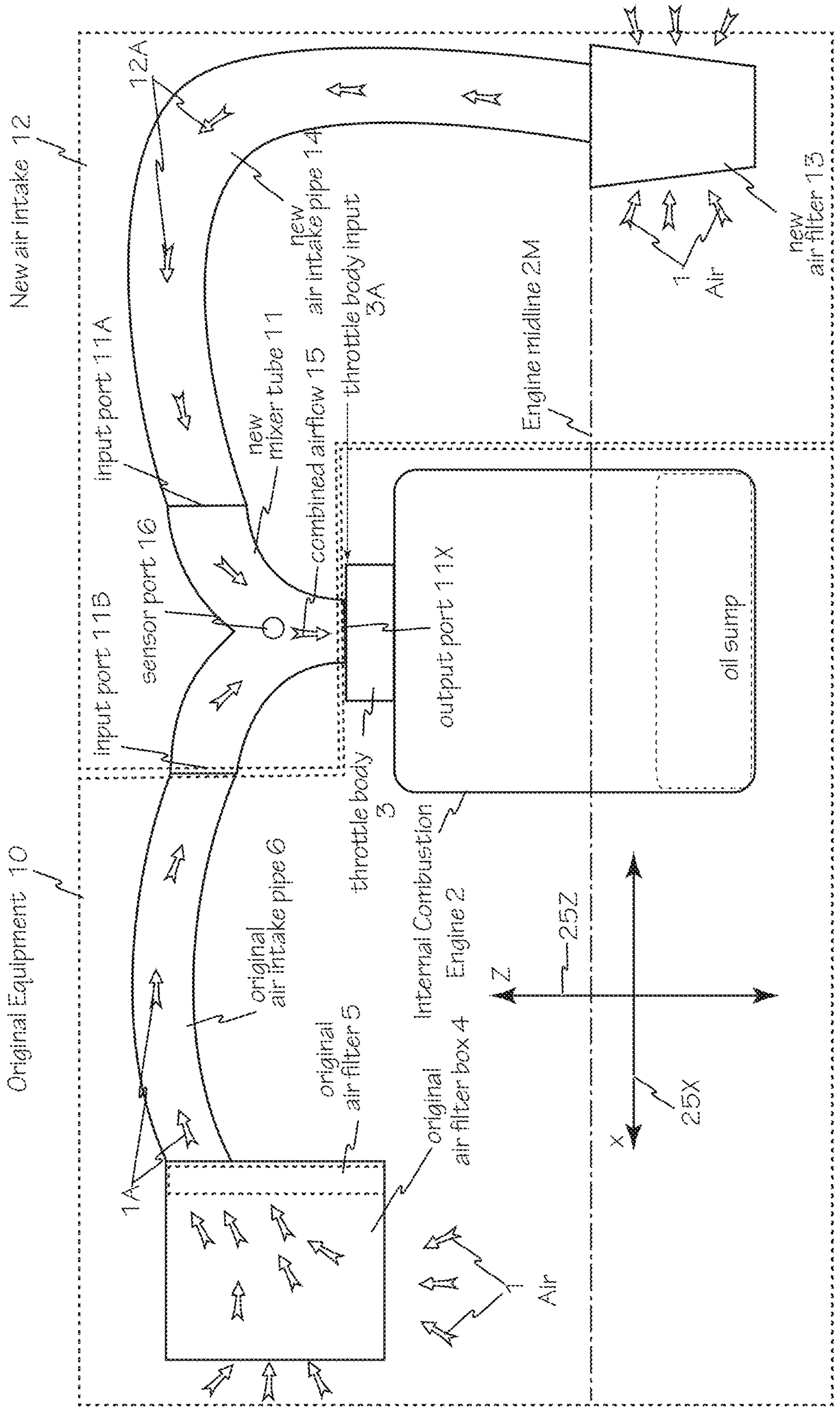
FIG. 1 is a block diagram of an improved internal combustion engine air intake system.

The improved internal combustion engine air intake system illustrated in FIG. 1 filters and conducts air 1A to engine 2 via throttle body 3. The original equipment air intake components 10 include the original equipment air filter box 4 enclosing the original equipment air filter 5 and the original equipment air intake pipe 6 operably connected between air filter 5 and the throttle body air intake 3A, all located above the engine midline 2M which is parallel to X-axis 25X. New mixer tube 11 connects the original equipment air intake pipe 6 to first input 11B and the throttle body air intake 3A to the mixer tube output port 11X and provides an additional input port 11A to permit additional airflow from the additional air intake 12. The additional airflow 12A is provided to the throttle body 3 and engine 2 without changing or removing the original equipment air intake components 10.

Figure 2:
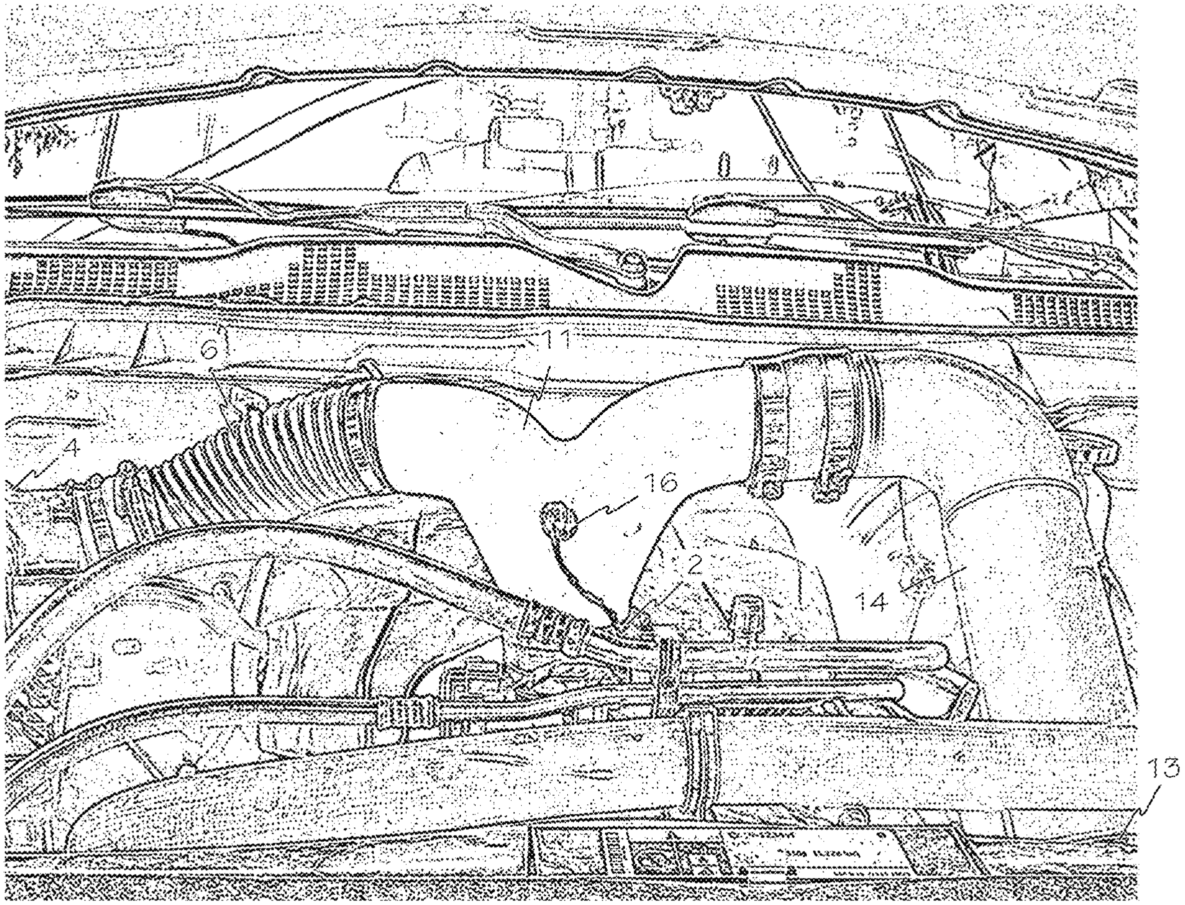
FIG. 2 is a photograph of an engine compartment with an improved internal combustion engine air intake system.
Figure 3:
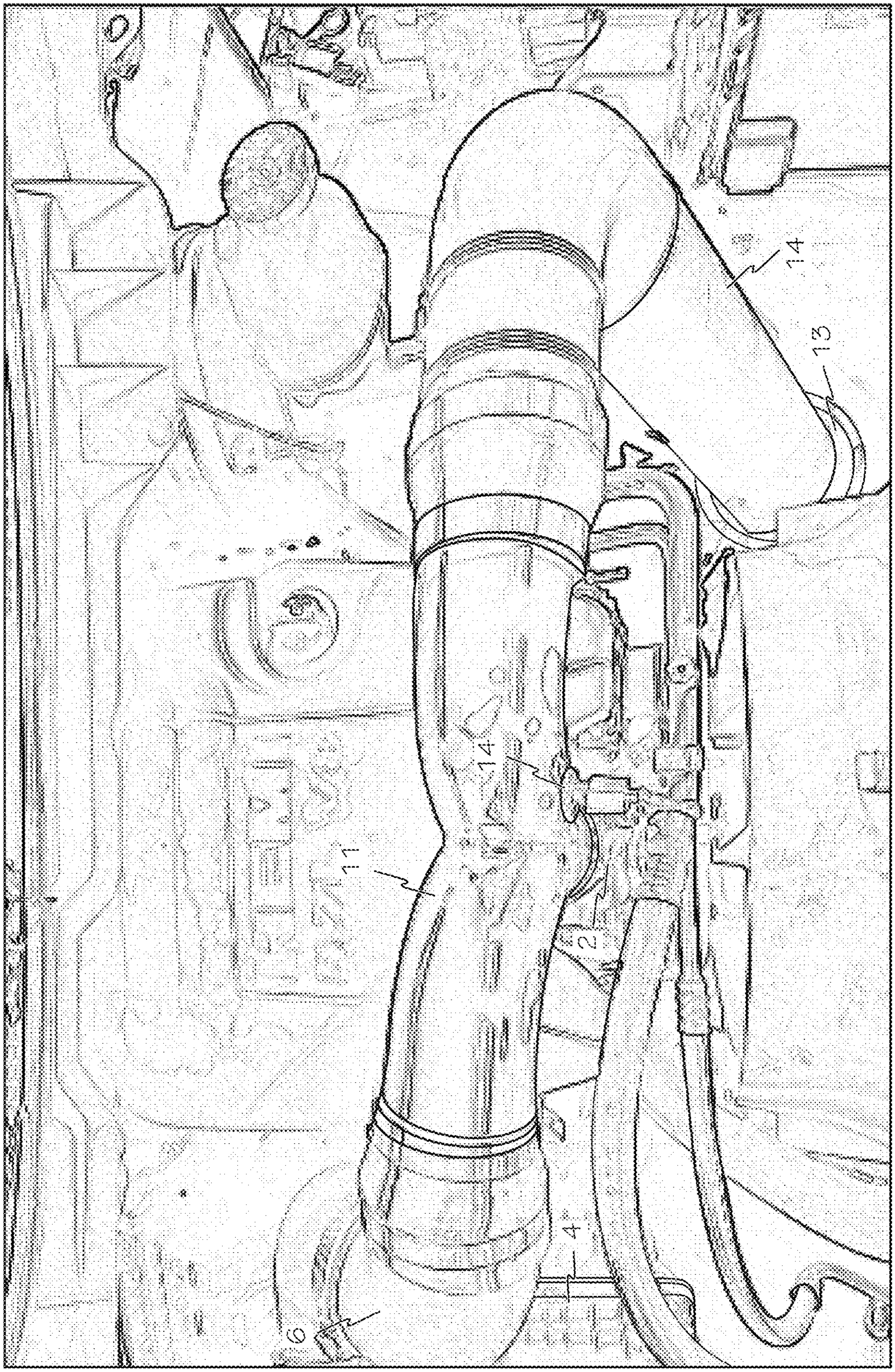
FIG. 3 is a photograph looking down on an engine compartment with an improved internal combustion engine air intake system.
Figure 4:
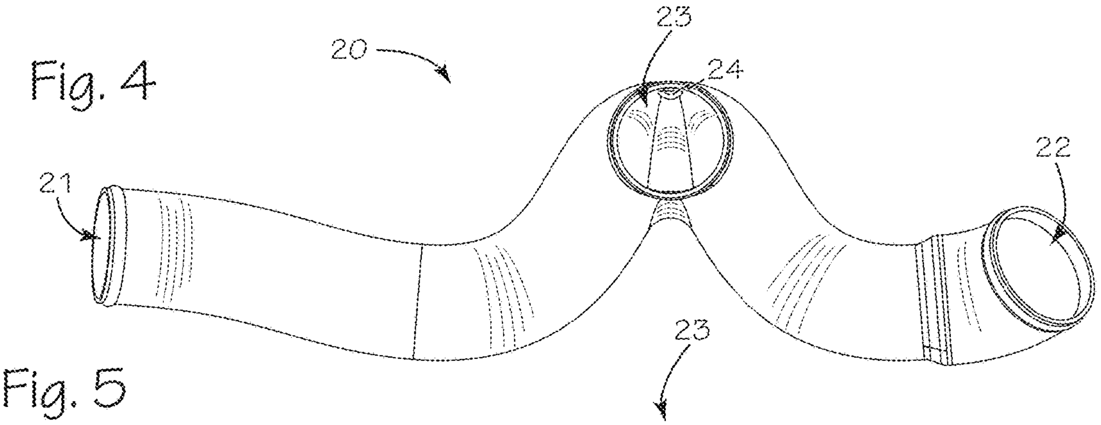
FIG. 4 is a bottom view of an alternate mixer tube.
Figure 5:
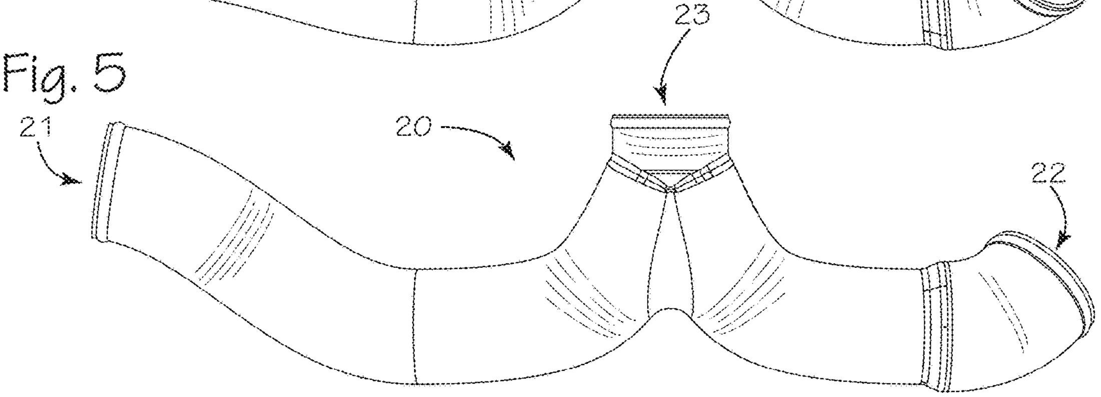
FIG. 5 is a rear view of the alternate mixer tube of FIG. 4.
Figure 6:
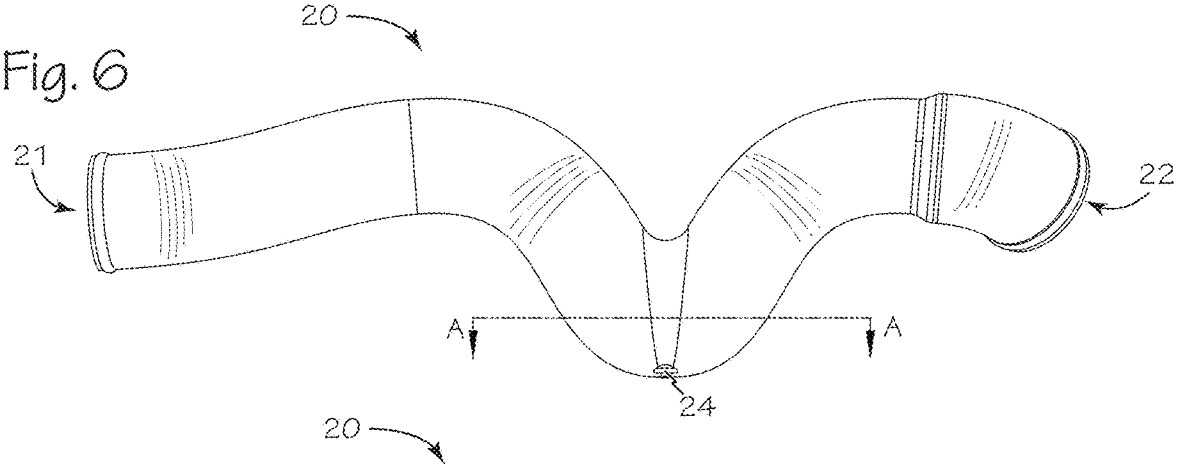
FIG. 6 is a top view of the alternate mixer tube of FIG. 4.
Figure 7:
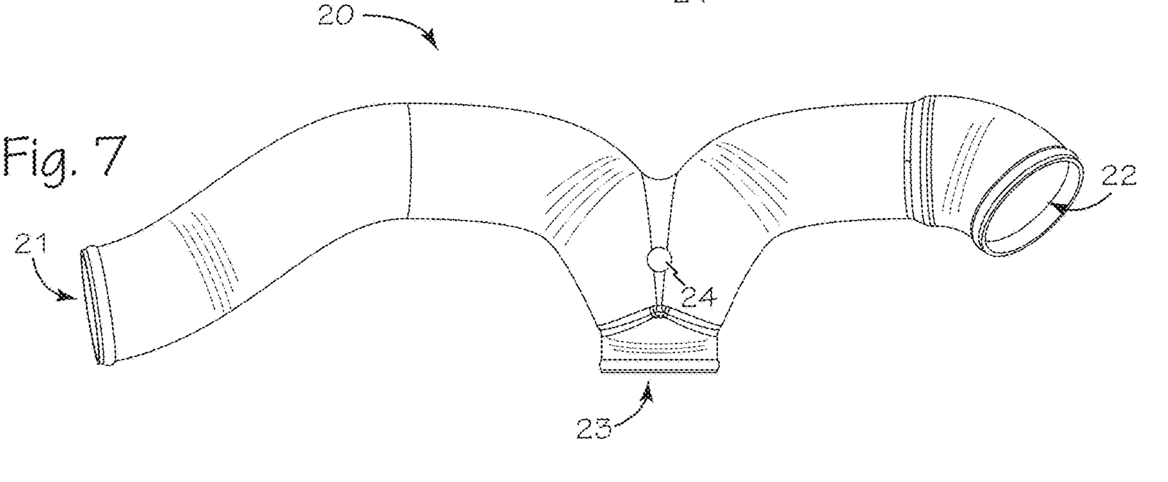
FIG. 7 is a front view of the alternate mixer tube of FIG. 4.
Figure 8:
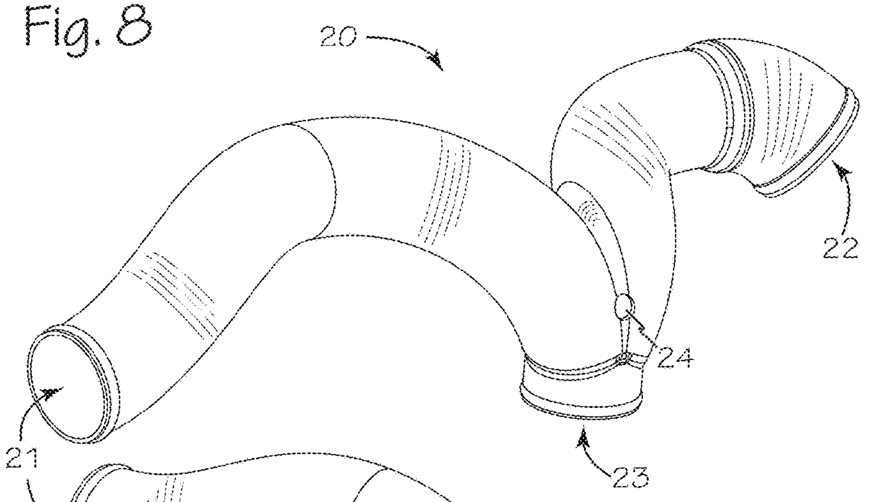
FIG. 8 is a front left perspective view of the alternate mixer tube of FIG. 4.
Figure 9:
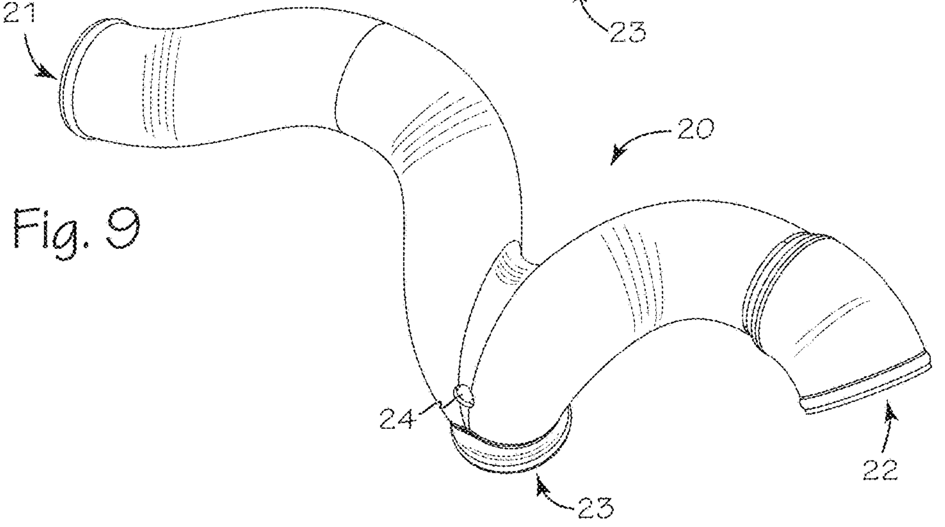
FIG. 9 is a top right perspective view of the alternate mixer tube of FIG. 4.
Figure 10:
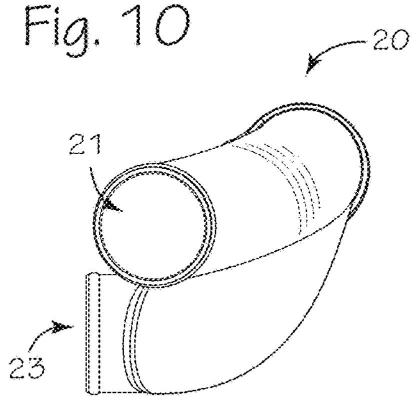
FIG. 10 is a left side view of the alternate mixer tube of FIG. 4.
Figure 12:
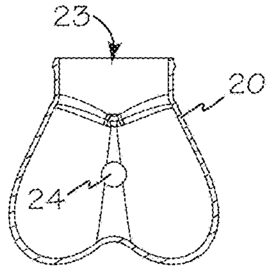
FIG. 12 is a cross-section view of the alternate mixer tube of FIG. 6 taken along A-A.
Figure 11:
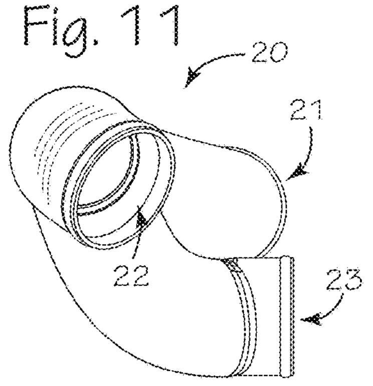
FIG. 11 is a right side view of the alternate mixer tube of FIG. 4.

Mixer tube 11 is generally "Y" shaped and connects to one or more additional airflow inputs and integrates the additional airflows with airflow 1A from the original equipment components. Input port 11A of the mixer tube conducts additional airflow 12A drawn in from the new air filter 13 through the new air intake pipe 14. In the configuration illustrated in FIGS. 1 through 3, the additional airflow 12A is drawn from a different place than the airflow 1A through the original equipment components. In this case the original air filter box 4 is located high in the engine compartment, above the midline 2M on the right side of the vehicle. The additional air intake components 12 draw air from at or below midline 2M of the engine on the left side of the engine compartment. This configuration optimizes the likelihood of the combined airflow 15 will be cooler and more dense than airflow 1A alone. An optional sensor port 16 may be include in the mixer tube in any suitable location.

The original equipment original equipment air intake components 10 may be located in any suitable location in the engine compartment however they are generally located above the midline of the engine to simplify engine service. The new air intake system and particularly new air filter 13 is configured to draw air in from at or below the engine midline 2M.

An alternate mixer tube 20 is illustrated in FIGS. 4 through 12. Alternate mixer tube 20 is generally "Y" shaped and has a first input port 21, a second input port 22, an output port 23 and an optional sensor port 24.

Figure 13:
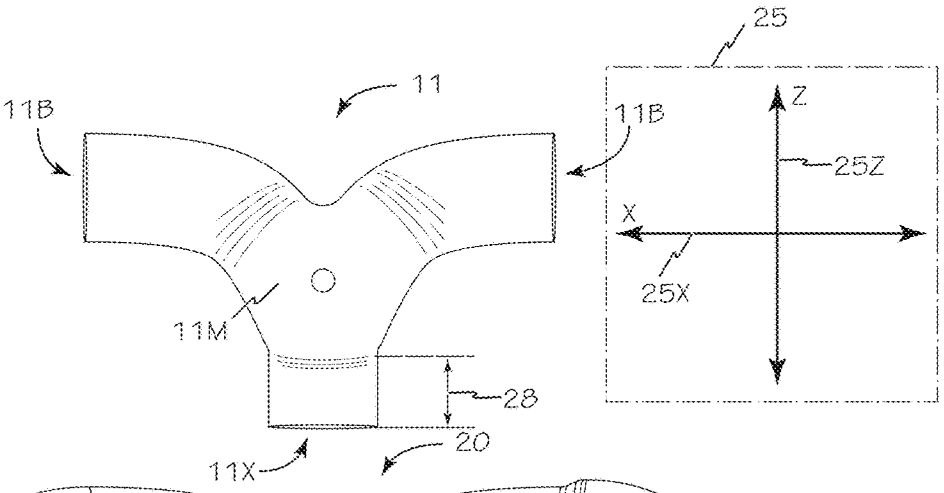
FIG. 13 is a front view of a first mixer tube of FIGS. 1, 2 and 3.
Figure 15:
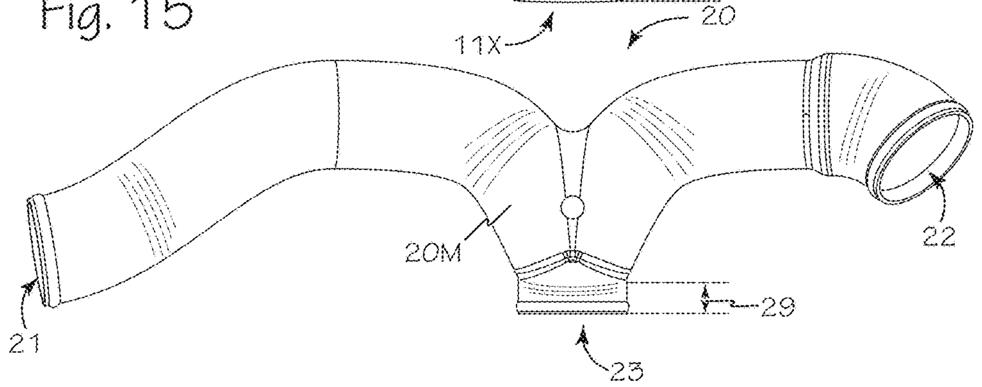
FIG. 15 is a front view of the alternate mixer tube of FIG. 4.
Figure 14:
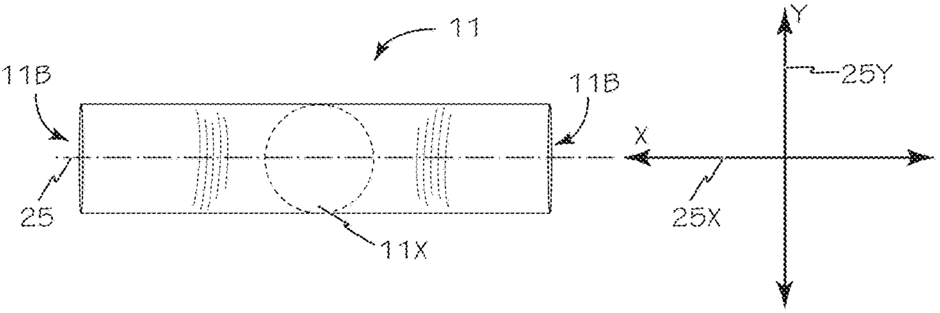
FIG. 14 is a top view of the mixer tube of FIG. 13.
Figure 16:
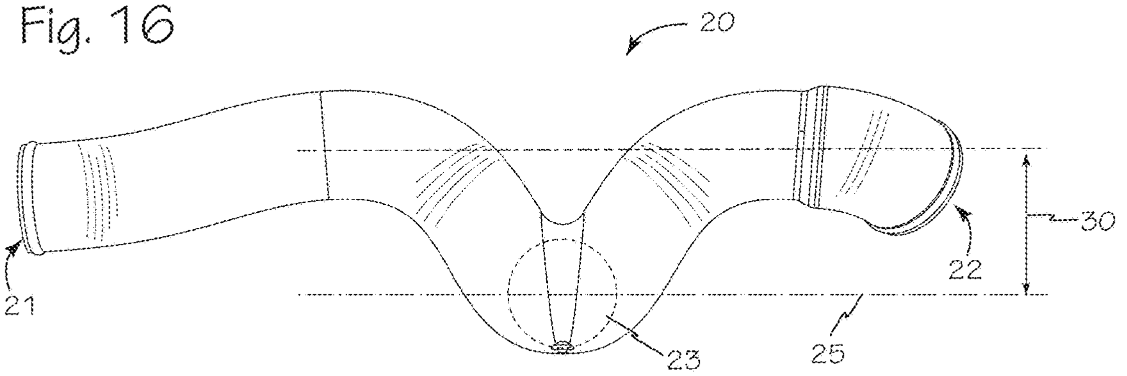
FIG. 16 is a top view of the alternate mixer tube of FIG. 4.

Referring now to FIGS. 13 and 14, mixer tube 11 is "Y" shaped and generally planar in the X-Z plane 25 represented by X axis 26 and Z axis 27. Input ports 11A and 11B are in X-Z plane 25 with output port 11X. As illustrated in FIG. 13 the mixer chamber 11M is first output offset distance 28 from output port 11X. This configuration permits air flows 1A and 12A to collide head-on in mixer chamber 11M well above the throttle body input 3A leading to combined airflow 15 being turbulent. Alternate mixer tube 20 is illustrated in FIGS. 4-12, 15 and 16 provides improved airflow with less turbulence than mixer tube 11. Alternate mixer tube 20 has a second output offset distance 29 between mixer chamber 20M and output port 23 which is less than first output offset distance 28. Additionally, input ports 21 and 22 have an input offset 30 from the output port 23 along the Y-axis 25Y. This input offset and the smaller output offset distance encourages stability in combined airflow 15.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

I claim:

1. An improved vehicle air intake system for an internal combustion engine, a throttle body with an air intake port operably connected to an original air intake pipe operably connected to an original air filter, the improvement comprising:

a "Y" shaped mixer tube having first and second input ports and an output port, the mixer tube replacing the original air intake pipe operably connecting the first input port to the air filter and the output port to the throttle body air intake port;

a new air filter; and a new air intake pipe operably connecting the new air filter to the second input port.

2. The improved vehicle air intake system of claim 1 wherein the mixer tube further comprises a sensor port.

3. A vehicle air intake system for an internal combustion engine oriented relative to an X, Y and Z orthogonal axes, having a midline parallel to the X-axis and a throttle body above the midline, the throttle body having an air intake port, the air intake system comprising:

a "Y" shaped mixer tube having first and second input ports and an output port, the first and second input ports are offset from the output port along the Y-axis and the Z-axis and the output port is operably connected to the throttle body air intake port;

a first air filter operably connected to the first input port; and a second air filter operably connected to the second input port.

4. The vehicle air intake system of claim 3 wherein the mixer tube further comprises a sensor port.

5. A vehicle air intake system for an internal combustion engine having a midline and a throttle body having an air intake port the air intake system comprising:

a "Y" shaped mixer tube having first and second input ports and an output port, the first and second input ports offset from the output port parallel to the midline and the output port is operably connected to the throttle body;

a first air filter operably connected to the first input port; and a second air filter operably connected to the second input port.

6. The vehicle air intake system of claim 5 wherein the mixer tube further comprises a sensor port.

* * * * *